United States Patent [19]

Schultz

[11] Patent Number: 5,143,265
[45] Date of Patent: Sep. 1, 1992

[54] ARTICLE HOLDER FOR AN OPEN DASHBOARD COMPARTMENT

[76] Inventor: Stephen W. Schultz, 2917 Columbine, San Diego, Calif. 92105

[21] Appl. No.: 633,148

[22] Filed: Dec. 24, 1990

[51] Int. Cl.$^5$ .......................... B60R 7/00; B60N 3/12
[52] U.S. Cl. ........................... 224/42.42; 296/37.12
[58] Field of Search .................... 224/42.42, 47.42; 296/37.1, 37.6, 37.8, 37.12

[56] References Cited

U.S. PATENT DOCUMENTS

| | | | |
|---|---|---|---|
| 1,502,180 | 7/1924 | Dever, Jr. | 224/42.42 |
| 4,099,814 | 7/1978 | Hasselberger | 296/37.12 |
| 4,522,442 | 6/1985 | Takenaka | 224/42.42 |
| 4,706,810 | 11/1987 | Petrilli | 296/37.12 |
| 4,793,648 | 12/1988 | Zerilli | 296/37.12 |
| 4,811,981 | 3/1989 | Benson | 296/37.12 |
| 4,846,382 | 7/1989 | Foultner et al. | 224/42.42 |

*Primary Examiner*—Henry J. Recla
*Assistant Examiner*—David J. Walczak
*Attorney, Agent, or Firm*—Brown, Martin Haller & McClain

[57] ABSTRACT

A casette or article holder for installation in an open glove compartment type storage space in a vehicle instrument panel, where the unique cassette holder is easily and quickly installed into the opening and particularly arranged for holding articles such as cassettes in position, which article holder is restrained from movement in the opening, and the article holder can be quickly installed and removed without damaging the dashboard of the vehicle.

11 Claims, 2 Drawing Sheets

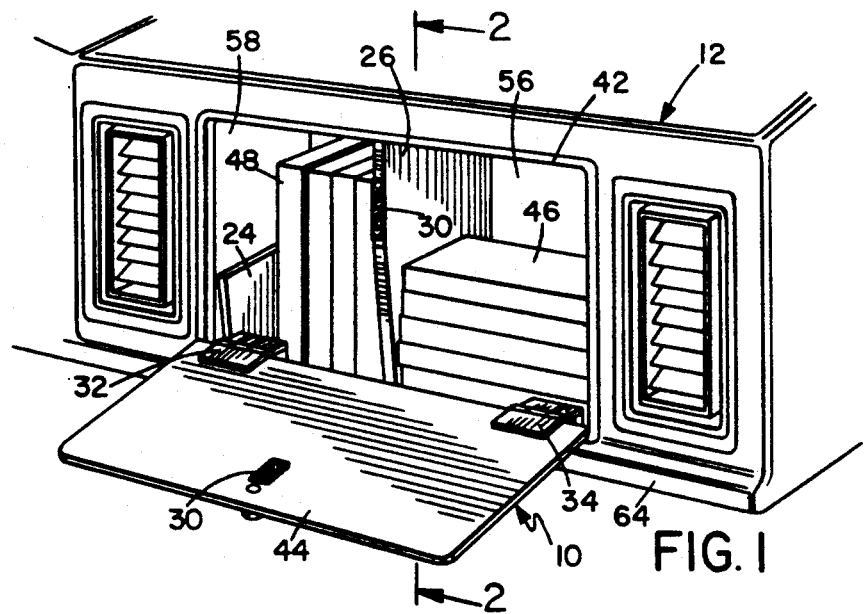
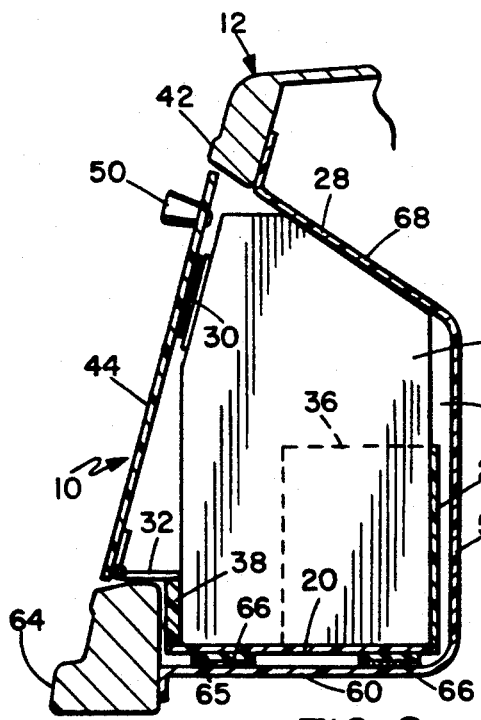
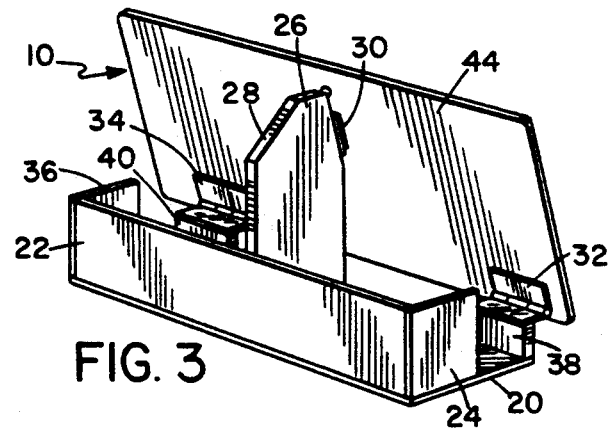
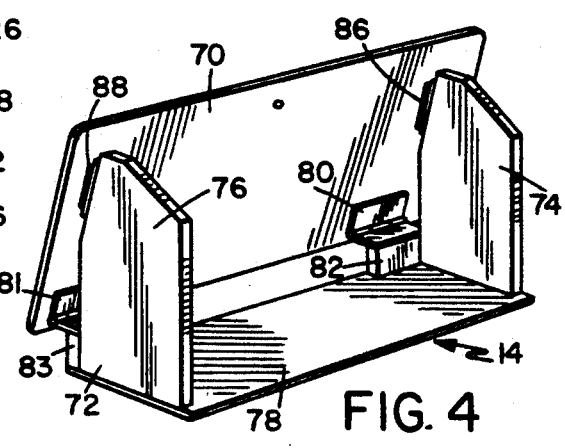

ARTICLE HOLDER FOR AN OPEN DASHBOARD COMPARTMENT

BACKGROUND OF THE INVENTION

There are vehicles including automobiles and trucks that have open compartments in the vehicle's dashboard or instrument panel. These spaces are used for placing or storing various articles. Where the spaces are small, then it is oftentimes impractical to place various small articles in such open compartments. However, where the compartments are relatively large, as in dashboards in some trucks for example; the spaces are so large that the compartments are oftentimes not used. Because large articles placed in the space can easily fall out, especially where the vehicle is a truck that is subject to a lot of vehicle vibrations or where the truck is for example, used on bumpy roads or in other environments. So it is advantageous to turn this oftentimes useless space in the dashboards of vehicles such as trucks and the like, into something useful. However, to remove the dashboard to provide a new dashboard that has a covered compartment, or to insert some type of means for retaining articles within the open compartment, oftentimes requires a modification such as a permanent installation of some type, that mars or damages the vehicle instrument panel, should it ever be removed.

It is therefore very advantageous to provide a means for holding audio cassettes or other articles in a retained position in the open compartments, which then turns the useless space in the compartment into something that is useful, and which provides a cover to the opening that conceals the user's tapes or other valuables from outside visibility. This holder means should be fashioned for easy insertion into the opened glove compartment, be secured against movement in the compartment, and yet be easily and quickly removed without damaging or marring the compartment or the dashboard of the vehicle.

SUMMARY OF THE INVENTION

The present invention resulted from the recognition by the inventor that a need existed to turn into useful space the open compartments in the dashboard of vehicles, such as in truck dashboards. This required that the opening in the dashboard be more than just closed; that the open compartment be converted to a holder that retains articles from falling out of the opening, and also to have an article holder particularly adapted for storing cassettes or other similar type articles. Further this use of space should be utilized in an efficient manner, but yet not require that the dashboard be removed, or that installations be made that would mar or otherwise damage the dashboard, which could result in a devaluation of the vehicle should it be desirable to remove whatever was inserted at a later date.

The inventor accordingly has devised a new and useful article holder device that is quickly and easily adapted for insertion into the particularly configured, open compartments in the dash of existing trucks and vehicles, which holder is particularly adapted for holding cassettes, and which article holder can be easily and quickly removed; and at the same time the article holder is substantially, rigidly held within the opening so that the article holder and/or cassettes in the article holder do not bounce and vibrate around in the open compartment, or tend to cause the cassettes or holder to fall out of an open compartment.

In doing this, the inventor provides an article or cassette holder for installation into the opened compartment which holder comprises a base member for fitting into the compartment. The base member has a vertical member that is shaped to fit into the compartment and yet to abut against the top of the compartment with the base member abutting against the bottom of the compartment, in a manner that holds the article or cassette holder from moving vertically or bouncing around within the compartment. A pivotal cover is connected to the base member and pivots to open and close the compartment, and not just to cover the cassette holder. This cover contacts the front edge of the vertical member and is releasably secured to the vertical member in the closed pivotal position. The cassette holder also has side members and back members that aid in holding the cassettes in a stacked position in a given sized compartment, and for retaining cassettes in the stacked position.

In another embodiment, the vertical members are connected to the base member at each end and coact with the pivotal cover panel to provide a holder that is insertable within the open compartment in the dash. The vertical members function as previously described to hold the holder within the compartment. In this embodiment, no back member is necessary since the holder comprises a means for converting the open compartment into a closed dashboard compartment.

In still another embodiment, the cassette or article holder comprises an elongated rack member which has a plurality of cassette holder sections and which utilizes two end vertical members and a centrally located vertical member for coacting with a pair of pivotally supported covers to provide a cassette holder rack to be fitted within a long and otherwise normally useless open compartment space. In this embodiment, the rack is held in position by securing the base member of the rack to the bottom wall of the compartment.

It is therefore an object of this invention to provide a new and improved article holder for holding cassettes or other articles, which holder is insertable and removable from an open compartment in the dash or dashboard of an automotive vehicle, without drilling holes in or otherwise damaging the dash, or dashboard.

The foregoing and other objects of the present invention as well as the invention itself, may be more fully understood from the following description when it is read in conjunction with the accompanying drawings and in which like numerals designate like parts throughout and in which:

BRIEF DESCRIPTION OF THE DRAWINGS

FIG. 1 is a perspective view illustrating one configuration of the article or cassette holder installed in a glove compartment type storage space in a vehicle's dashboard or instrument panel;

FIG. 2 is an enlarged sectional view taken on Line 2—2 of FIG. 1;

FIG. 3 is a rear perspective view of the cassette holder;

FIG. 4 is a rear perspective view of another embodiment of the article or cassette holder;

DESCRIPTION OF THE PREFERRED EMBODIMENT(S)

Figure 5:
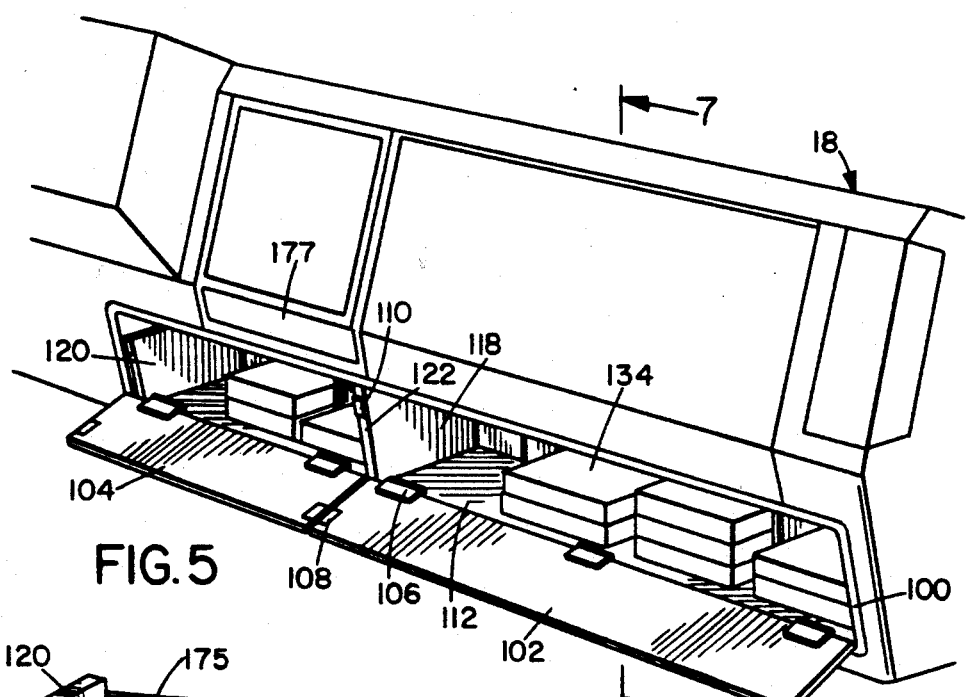
FIG. 5 is a perspective view of the embodiment in FIG. 6 of the cassette holder installed in an elongated shelf space under a dashboard or instrument panel.

Referring now to FIG. 1 there is illustrated a portion of dashboard 12 of a motor vehicle, such as a truck, that has an open compartment 42 with the opening lying in a plane that is angled toward vertical, as illustrated in FIG. 2. This open compartment 42 has a top wall 68, a bottom wall 60 and end walls 58. The open compartment is characterized by having a front rim or compartment ledge 64 that forms a shoulder or raised edge 65 to the bottom of the compartment 60, to hold articles from sliding easily out of the opening 42.

An embodiment of the inventor's holder for articles or cassettes as illustrated in FIG. 3, comprises a base member or back wall 20 with a back member 22 and side members 24 and 36. Front pieces or holder ledges 38 and 40 project upwardly and support respective hinges 32 and 34 that are connected to the front cover 44. Positioned midway the length of the base member 20 is a vertical member 26. Vertical member 26 is secured at the rear surface to the back member 22 and at the lower edge surface to the base member 20. The upper edge 28 of the vertical member 26 is angled to fit against the angled surface of the top wall 68 of the open compartment 42.

The front cover 44 pivots on hinges 32 and 34 to an open position as illustrated in FIG. 1 or to a closed position as illustrated in FIG. 2. A releasable holding means 30 is provided which retains the cover 44 in the closed position. This releasable means may be a velcro connection as illustrated, or it can be any type of known magnetic or friction type holding means. Knob 50 connected to the cover 44 is used to open and close the cover. It may be understood that the cover 44 fits into the opening 42 of the compartment and thus closes the compartment.

The holder 10 is inserted into the open compartment, see FIG. 2, by sliding the entire unit over the rim or shoulder 65 of the bottom piece of the open compartment 42. Thus member 38 then fits or abuts against the rim surface 65 sufficiently to retain the holder 10 in position. To further secure the holder in position, adhesive members 66 are used to secure the base 20 of the holder 10 to the bottom wall 60 of the compartment 42. In this position, the upper edge 28 of the vertical member 44 presses against the upper top wall on the angled forwardly rear edge 68 of the compartment 42, which restricts the holder 10 from vertical movement.

In operation, cassettes 46 and 48 or other similar articles are placed in the holder 10 to rest on the base 20. The cover 44 is pivoted in or out of the closing position to access the holder. If it is desired to remove the holder 10 from the compartment 42, then the holder is merely grasped and pulled out of the compartment 42 by overpowering the adhesive connections 66. The adhesive connections 66 can then be removed from the bottom of the compartment. It may thus be understood that the holder 10 is quickly and easily inserted into a retained positive position within the open compartment 42, and may be quickly and easily removed without any holes or other damages to the dashboard 12.

Referring now to FIG. 4, a second modification of the cassette or article holder 14 has a base member 78 with two vertical members 72 and 74 that are also the end members. Secured to the end members 72 and 74 are blocks or holder ledges 82 and 83 on which are secured hinge members 80 and 81. The blocks respectively aid in holding the vertical or side members 72 and 74 to the base holder 78. A pivotal cover or panel 70 is attached to the hinge members 80 and 81, and pivots in the same manner as previously described regarding the embodiment of FIG. 3. Velcro fasteners 86 releasably hold the cover in the closed position. The upper end of the vertical members 74 have the angled edge surfaces 76 that fit against the top wall 68 of the compartment 42, see FIGS. 1 and 2.

The embodiment 14 in FIG. 4 is inserted into the open compartment 42 in the same manner as previously described with regard to FIGS. 1 and 2. In this embodiment, there is no back member 22. So compartment 42 is relatively open except for the vertical members 72 and 74. There is an open space, but other than this, the compartment is completely closed by the cover 70. The embodiment in FIG. 4 is held against vertical movement and against front and back movement and is secured to the bottom wall 60 in the same manner as previously described relative to the embodiment in FIG. 3.

Figure 6:
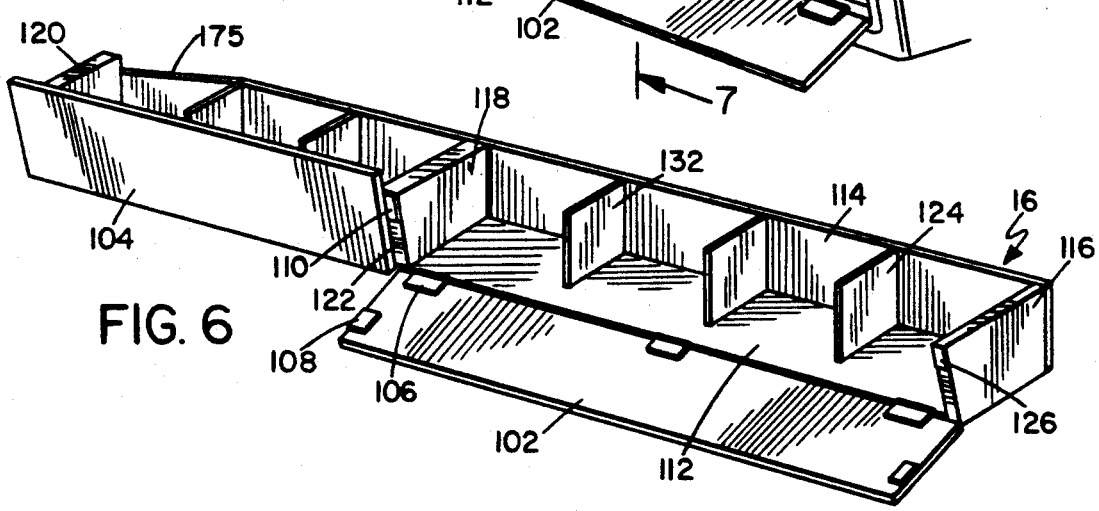
FIG. 6 is a rear view of the cassette holder of FIG. 5.
Figure 7:
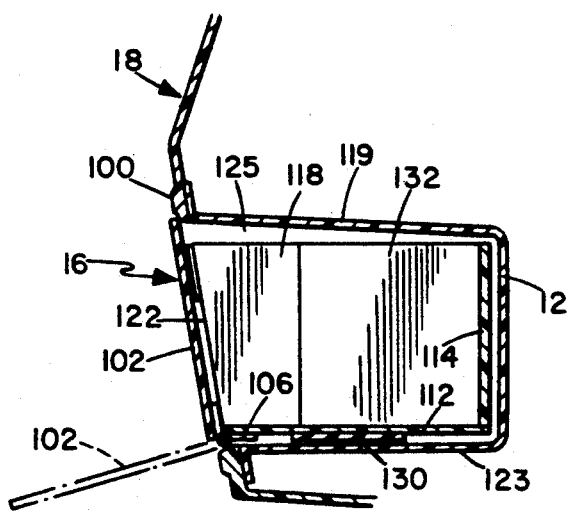
FIG. 7 is an enlarged sectional view taken on Line 7—7 of FIG. 5.

Referring now to FIG. 6, there is still another embodiment of the invention that is to be inserted into the open compartment 100 in the dashboard 18, which is the dashboard of a truck. The opening 100 has an open compartment that has top wall 119, a rear wall 121 and a bottom wall 123 and a pair of end walls 125. The plane of the opening of compartment 100 is at an angle as illustrated in FIG. 7.

The cassette or article holder of this embodiment, see FIG. 6, comprises a base 112 with side ends 116 and 120 and with a back member 114. The two side members or end members 120 and 116 are also vertical members that are the same as the mid-vertical member 118, and all are secured both to the back member and to the base member 112. The front edge surfaces 122 of each of the vertical members 118, 120 and 116 are at the angle and in the same plane as is the plane of the opening in the open compartment 118. Connected to the front edge of the base 112 are a plurality of hinges 106 that are connected to the lower side of the front covers 102 and 104. Accordingly these covers or panels pivot from the open position as illustrated in FIG. 6, to the closed position as illustrated FIG. 7. Releasable fastening means such as velcro connections 110 and 126, releasably hold the front covers in the closed position. The article or cassette holder also has partitions 124 and 132 that are spaced along the length of the base member 112, for retention of cassettes that are placed in the holder in stacked storage. One end of the back member 114 is angled downwardly at 175 to provide a recess for fitting around a projection that goes into the recess 100, resulting from an open and closeable ash tray, see FIG. 5. It may be thus understood that the holder 16 is specifically and easily adaptable for fitting around projections within the open compartments and still facilitate the easy insertion, and removable if necessary, and the securing in position of the holder 16 in the open compartment 100.

In operation, one side of the adhesive member 130 is secured to the bottom wall 123 of the compartment 100. The holder 16 is then placed into the compartment with the cover 102 in the down or open position. Hand pressure is then exerted against the upper surface of the base 112, pressing the base against the adhesive 130, securing the holder in position. The holder is then used in the manner previously described. Should it be desired to remove the holder from the compartment 100 in the dash 18, then the holder 16 is grasped and pulled out of the compartment 100, with sufficient force to override the adhesive connection 130.

Again it may be understood that in all of the inventor's embodiments, the respective cassette or article holders are easily and quickly installed and can be similarly easily and quickly removed from the open compartments, without damaging or marring the respective dashboards.

The respective cassette or article holder illustrated in FIGS. 5, 6 and 7 fit into open compartments in all of the Chevrolet S-10 trucks and Blazers, the Chevrolet S-15 trucks and the S-15 Jimmy truck models 1986–1991. This specifically applies to the particular embodiment illustrated in FIG. 6. The embodiments of the invention in FIGS. 1–4 fit all of the Ford Bronco II models and the Ford Ranger pickup truck models 1983–1988.

Having disclosed my invention, I now claim:

1. A cassette and article holder for installation in and removable from an open compartment type storage space in the dashboard of a truck, where the compartment has top, bottom and rear walls, two side walls with a front compartment opening along a given plane, and the compartment has a front, lower ledge in the plane of the opening with an upper portion of the rear wall angled forwardly toward the opening, said holder comprising:
   a base sized to support cassettes and shaped to fit into the compartment and substantially cover the bottom wall,
   at least one vertical member secured to said base and shaped to fit into said compartment,
   said vertical member has a front edge surface partially in the plane of the compartment opening and a rear edge surface positionable adjacent the rear wall of the compartment,
   said rear edge surface of said vertical member is angled forwardly toward the opening and presses against the upper angled portion of the rear wall when the holder is in position in the compartment,
   a holder ledge secured to a lower front edge of said vertical member adjacent to the compartment edge for retaining cassettes in the holder,
   a front cover shaped to cover the compartment opening,
   hinge means connected to a lower side edge of said cover and to a upper side of the holder ledge for pivotally moving the cover from an open position to a closed position adjacent the front edge surface of said vertical member,
   and means for releasably holding said cover to said vertical member in the position of closing the compartment opening.

2. A cassette and article holder as claimed in claim 1 including, adhesive means positioned between said base and said bottom wall for holding said cassette holder in said compartment.

3. A cassette and article holder as claimed in claim 1 wherein one of said at least one, vertical member is positioned at each end of said base to form end walls for said cassette holder.

4. A cassette and article holder as claimed in claim 1,

5. A cassette and article holder as claimed in claim 1 wherein,
   a pair of side members are supported on each end of said base member,
   a back member is connected to said base member and said side members,
   and said vertical member is connected to said back member and said base member.

6. A cassette article holder as claimed in claim 1 wherein,
   a back wall is connected to the rear surface of the vertical member,
   and side members are positioned at each end of said base with one side edge of each of said side members secured to said back wall.

7. A cassette article holder as claimed in claim 6 wherein,
   said back wall and said side members extend upwardly a distance substantially less than the length of the rear edge of said vertical member.

8. A cassette article holder as claimed in claim 1 wherein,
   said hinge means comprises at least two hinges secured between the holder ledge and the lower side edge of the front cover.

9. A cassette article holder as claimed in claim 8 in which,
   each of said hinges comprises two pivoting parts, wherein one part is secured to, said holder ledge and thereby extends a hinge pivot point a spaced distance to the front of the compartment ledge, and the cover is positioned on the other part and thereby in the compartment opening plane.

10. A cassette and article holder for installation in and removable from an open compartment type storage space in the dashboard of a truck, where the compartment has top, bottom and rear walls, and two side walls with a front compartment opening along a given plane, said holder comprising:
    a base sized to support cassettes and shaped to fit into the compartment and substantially cover the bottom wall,
    at least three vertical members positioned along the length of said base member, with one of said members positioned at a central point along the length of said base member,
    at least two front covers positioned along the length of said base member, with a bottom edge of each of said covers being pivotally connected to a front edge of the base member,
    and releasable holding means being positioned on said central vertical member, releasably holding both of said covers in a closed position separately.

11. A cassette and article holder as claimed in claim 10 which,
    a plurality of partitions are spaced along the length of said base member and are connected respectively to said base member and said back members.

* * * * *

UNITED STATES PATENT AND TRADEMARK OFFICE
CERTIFICATE OF CORRECTION

PATENT NO. : 5,143,265
DATED : September 1, 1992
INVENTOR(S) : Stephen W. Schultz It is certified that error appears in the above-identified patent and that said Letters Patent is hereby corrected as shown below:

Column 6, Line 3, after Claim 1, add the following

--including, side members positioned at each end of said base, and wherein one of said at least one vertical member is positioned midway the length of said base.--

Signed and Sealed this

Fourteenth Day of December, 1993

Attest:

BRUCE LEHMAN

Attesting Officer

Commissioner of Patents and Trademarks